UNITED STATES PATENT OFFICE.

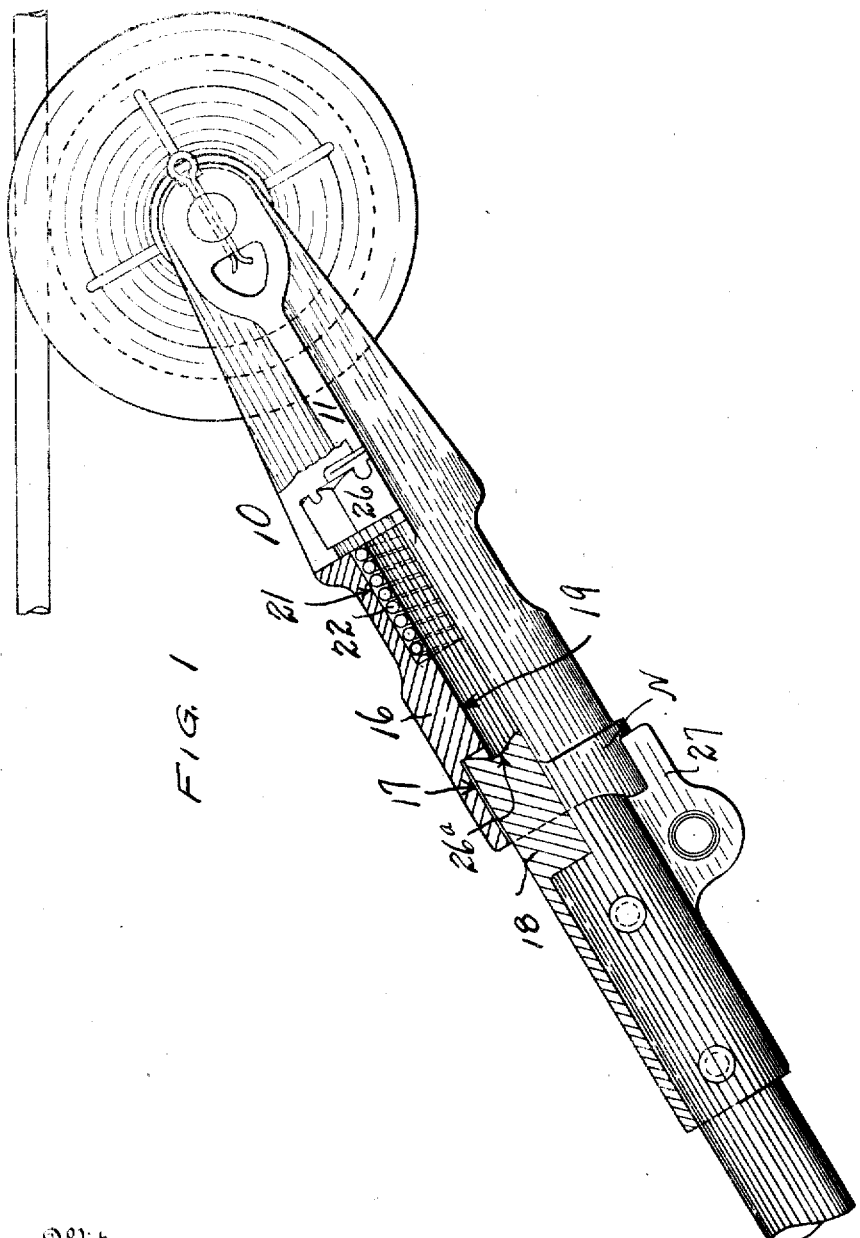

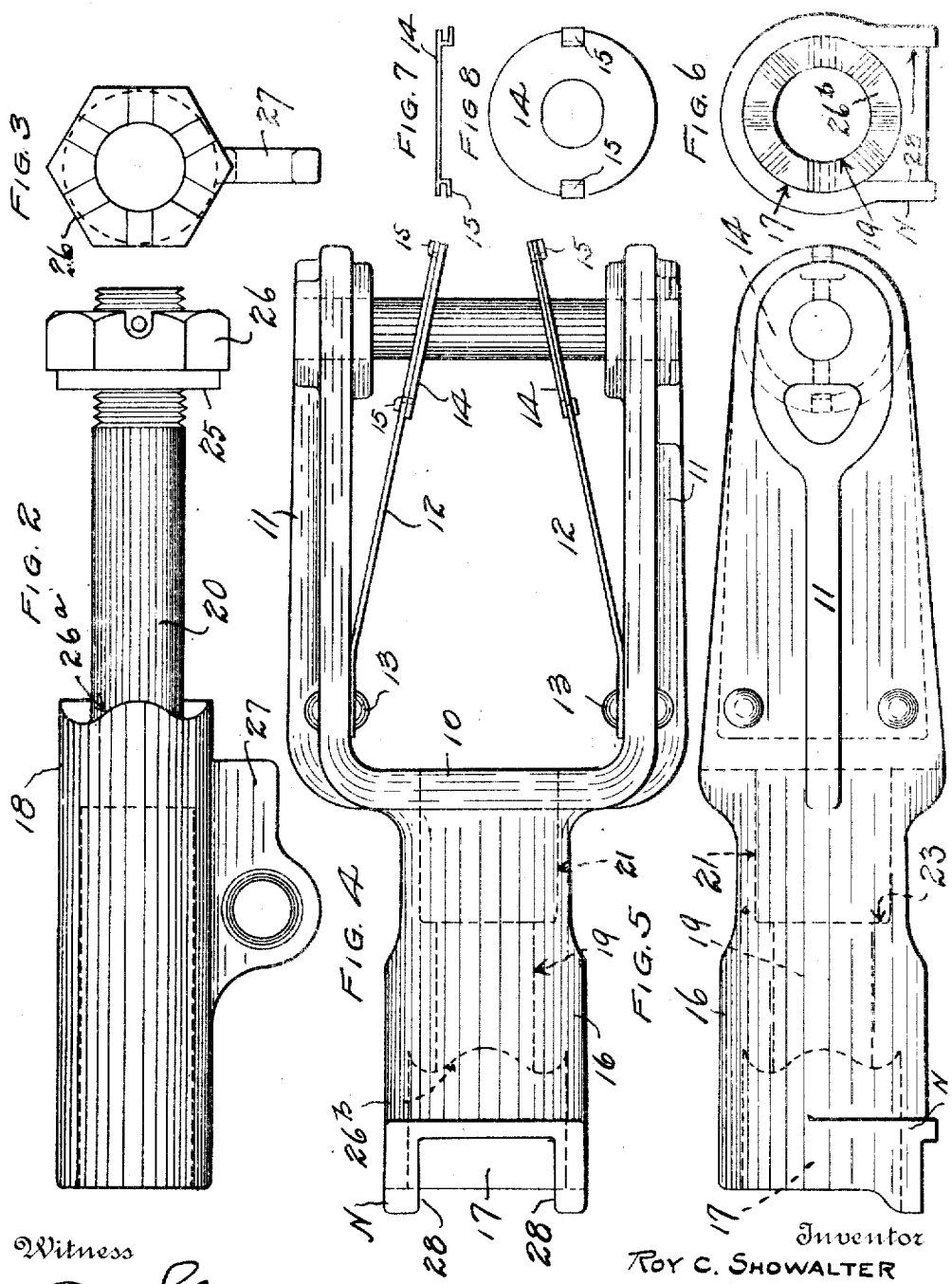

ROY C. SHOWALTER, OF ALTOONA, PENNSYLVANIA, ASSIGNOR OF ONE-THIRD TO JOHN P. REILLY AND ONE-THIRD TO FRED K. THIEME, BOTH OF ALTOONA, PENNSYLVANIA.

TROLLEY-HARP.

1,202,233.  Specification of Letters Patent.  Patented Oct. 24, 1916.

Application filed January 25, 1916. Serial No. 74,198.

*To all whom it may concern:*

Be it known that I, ROY C. SHOWALTER, a citizen of the United States, residing at Altoona, in the county of Blair and State of Pennsylvania, have invented certain new and useful Improvements in Trolley-Harps, of which the following is a specification.

This invention relates to trolley systems and has particular reference to the manner in which the current is collected from the trolley wire, after which it flows to the motors and thence to the rails.

The primary object of this invention is to provide an improved trolley harp, and harp mounting device, whereby the usual wear that is now taken by the trolley wheel and trolley wire is greatly reduced, thus manifestly saving replacements of trolley wheels or current collectors, as well as greatly prolonging the life of the conducting wire.

Another object of the device is to provide novel and compact means whereby the trolley wheel is enabled to follow the wire around curves and crossovers, without leaving the wire or scraping along the same.

A still further object of the device is to provide additional removable current collecting devices which not only facilitate in the current collection, but provide adequate means whereby these devices can be readily taken off and replaced, thus increasing the life of the harp in a very practical way.

A still further object of the device is to provide a trolley harp, with a trolley harp support designed in such manner that the shank of the trolley harp envelops a portion of the harp support in such a manner as to make arcing between the harp and the harp support impossible, while at the same time providing means for allowing the harp to slightly rotate on the support, thus increasing the tension on a resilient element so designed and positioned as to hold the harp yieldingly against the support.

With these and many other objects in view, which will be more readily apparent as the nature of the invention is better understood, the same consists of the novel construction, combination and arrangement of parts as will be hereinafter fully pointed out, illustrated and claimed.

It will be quite readily understood by those skilled in the art to which this belongs, that the invention is susceptible to some structural modification and changes without departing from the spirit or scope of the invention, but a preferred and practical embodiment thereof is shown in the accompanying drawings, in which—

Figure 1 shows my improved device in its relation to the trolley wheel and trolley wire. Fig. 2 shows a side view of the trolley harp support and clearly illustrates the manner of forming the joint between the harp and the harp support. Fig. 3 shows an end view of the parts shown in Fig. 2. Fig. 4 is a plan view of the improved harp, showing the additional removable current collecting devices positioned on either side of the harp, as well as showing the means with which the harp coöperates with the harp support. Fig. 5 is a side elevation of the parts shown in Fig. 4. Fig. 6 is an end view of the harp shank showing more clearly the harp support. Fig. 7 is an edge view of one of the removable washers, which bear against the hub of the trolley wheel and assist in collecting the current. Fig. 8 is an elevational view of the parts shown in Fig. 7.

Like reference numerals refer to similar parts throughout the several figures of the drawings.

In carrying out this invention no change is contemplated in the usual trolley wheel or wheel axle, and to this end I provide a trolley wheel harp designated by the numeral 10, having spaced jaw arms 11, to which are attached yieldable metal strips 12, preferably brass, through the medium of rivets 13 or similar means.

The brass strips 12 are each provided with a removable trolley wheel hub bearing washer 14, adapted to be firmly secured to the brass strips 12, through an angled engaging ledge 15, which is designed to pass through a perforation in the brass strips 12, and afterward bent downward as shown in order to prevent rotation with the trolley wheel hub.

The shank 16 of the trolley harp is preferably provided with an axial opening of three diameters, the first 17, of which is adapted to receive the end 18 of the trolley wheel harp support, while the portion 19 receives the stem 20 of the harp support.

The diameter 21 provides a socket which is adapted to receive a resilient element 22, which envelops the stem 20 and has sufficient room for its free movement. A shouldered abutment 23 acts as a stop or rest for one end of the spring 22, while the opposite end 24 is designed to bear against the face 25 of the tension adjusting nut 26.

It will be obvious from the construction that any rotation of the harp 10, with reference to the harp support, will be resisted by the resilient element 22, since the irregular surfaces 26ᵃ and 26ᵇ are firmly held together through the action of the spring.

The irregular surfaces 26ᵃ and 26ᵇ are preferably made in the shape of teeth in the edge of end 18 of the support as well as in the peripheral edge of the mouth of the opening 19 in the shank 16, as clearly shown in the drawings.

For the purpose of limiting the rotary movement or play of the harp with reference to the harp support permitted by the faces 26 and 26' and the spring 22, there is provided a perforated ear 27 which, when the parts are assembled as shown in Fig. 1, engages the opposite sides 28 of the notched portion N of the trolley harp shank, thus rotation is restricted to the amount usually found sufficient in street railway practice.

The ear 27 is perforated for the purpose of permitting the attachment of the trolley rope, which is used to place the trolley wheel upon the wire as well as to remove the same.

From the above description it is believed that the many advantages of the herein described trolley wheel harp and harp mounting will be readily apparent without further elaboration and

What I claim and desire to be secured by Letters Patent is—

1. In combination with a trolley harp, having shank and jaw members, metallic strips secured to the inside faces of the jaw members, a removable wearing washer detachably secured to the free end of the said metallic strips and a shank having a plurality of inside diameters.

2. In a device of the class described, the combination with a trolley pole of a trolley harp member having a shank portion provided with a plurality of different internal diameters, a harp support having a body member for engaging with said trolley pole and a stem of reduced diameter for fitting in said shank of the trolley harp and having a threaded end portion, said harp support also having a perforated ear depending therefrom, and means carried by the threaded end of the stem of said harp support for securing the harp thereto.

3. In a device of the class described, the combination with a trolley pole, of a trolley harp having a hollow shank, spaced jaw members, current collecting means carried by the jaw members, a harp support including a body portion having a socket for fitting over said trolley pole, and also having a reduced stem portion, the body of said support adjacent the reduced stem having a toothed portion, said toothed portion adapted to coöperate with a similar toothed portion on the shank of the harp, a spring arranged within the shank of the trolley harp and surrounding the end of the stem on the supporting member, and means carried by the end of said stem for tensioning said spring and securing the harp to its support.

4. A trolley harp comprising the combination with a support including a body having an end portion of reduced diameter, and an irregular friction face formed at the junction of said end with the body of the support, a trolley harp including a hollow shank adapted to fit over the end of said support, said shank having a portion adapted to receive the end of the body of the support, an opposite spring socket portion, and interlocking portion adapted to receive the reduced end of the shank, a friction face formed between one end of said interlocking portion and the end of the shank which receives the body of the support, a spring arranged in said spring socket portion, and means secured to the end of the reduced end portion of the shank for causing said spring to maintain the friction faces of the shank and support in engagement.

5. A trolley harp comprising the combination of a support having an end portion of reduced diameter, the extremity of which is threaded, said support also having a friction face formed at the end of said reduced portion opposite the threads, and a rigid offset portion, a harp having a shank portion adapted to telescope the reduced end of the support and having a friction face for matching with said friction face of the support, a nut for the threaded end of the support adapted to lock the harp thereto, said harp having a notch, the sides of which engage with said rigid projection of the support.

In testimony whereof I affix my signature in presence of two witnesses.

ROY C. SHOWALTER.

Witnesses:
 ALEX. WEIR,
 N. F. GERLACH.